(12) United States Patent
Hatton et al.

(10) Patent No.: US 6,382,032 B1
(45) Date of Patent: May 7, 2002

(54) APPARATUS AND METHOD FOR MEASURING FLOW OF GAS WITH ENTRAINED LIQUIDS

(75) Inventors: Gregory J. Hatton; Steven J. Svedeman, both of San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/423,675

(22) PCT Filed: May 13, 1998

(86) PCT No.: PCT/US98/09733

§ 371 Date: Nov. 10, 1999

§ 102(e) Date: Nov. 10, 1999

(87) PCT Pub. No.: WO98/52002

PCT Pub. Date: Nov. 19, 1998

Related U.S. Application Data

(60) Provisional application No. 60/047,007, filed on May 14, 1997.

(51) Int. Cl.[7] .................................................. G01F 1/74
(52) U.S. Cl. ................................................... 73/861.04
(58) Field of Search ..................... 73/861.04, 861.42, 73/861.52, 32 R, 861.63, 861.64

(56) References Cited

U.S. PATENT DOCUMENTS

| | | |
|---|---|---|
| 1,540,533 A | 6/1925 | Bullock |
| 1,559,155 A | 10/1925 | Bullock |
| 2,136,900 A | 11/1938 | Woolley |
| 3,100,840 A | 8/1963 | Morganstern ............... 250/43.5 |
| 3,378,022 A | 4/1968 | Sorenson ................... 137/81.5 |
| 4,337,668 A | 7/1982 | Zupanick ................. 73/861.61 |
| 4,453,417 A | 6/1984 | Moyers et al. ........... 73/861.42 |
| 4,562,744 A | 1/1986 | Hall et al. ............... 73/861.02 |
| 4,683,759 A | 8/1987 | Skarsvang et al. ........ 73/861.04 |
| 4,836,032 A | 6/1989 | Redus et al. ............. 73/861.04 |
| 5,025,160 A | 6/1991 | Watt ........................ 250/356.1 |
| 5,031,465 A | 7/1991 | Redus ...................... 73/861.04 |
| 5,031,466 A | 7/1991 | Redus ...................... 73/861.04 |
| 5,315,117 A | 5/1994 | Hatton et al. ............. 250/356.1 |
| 5,343,041 A | 8/1994 | Ruscev et al. .............. 250/270 |
| 5,400,657 A | 3/1995 | Kolpak et al. ........... 73/861.04 |
| 5,404,745 A | 4/1995 | Chien ........................ 73/29.01 |
| 5,421,209 A | 6/1995 | Redus et al. ............. 73/861.04 |
| 5,479,020 A | 12/1995 | Mohn ...................... 250/356.1 |
| 5,501,099 A | 3/1996 | Whorff ...................... 73/29.01 |

*Primary Examiner*—Benjamin R. Fuller
*Assistant Examiner*—Charlene Dickens
(74) *Attorney, Agent, or Firm*—Cox & Smith Incorporated

(57) ABSTRACT

An apparatus and method for making and using two measurements to correct metered flow rate values when liquids are present in a multiphase flow stream. The apparatus includes a conduit (10), an orifice (12) positioned within the conduit for creating differential pressure, a gamma ray densitometer including a radient energy source (22) and a radient energy detector (26) placed at an upstream side of the orifice for measuring upstream cross-sectional area and a pressure recovery port (34) placed downstream of the orifice for measuring the pressure recovery value.

10 Claims, 3 Drawing Sheets

APPARATUS AND METHOD FOR MEASURING FLOW OF GAS WITH ENTRAINED LIQUIDS

This Appln is a 371 of PCT/US98/09733 filed May 13, 1998 and claims benefit of Prov. No. 60/047,007 May 14, 1997.

BACKGROUND OF THE INVENTION

1. Field of the Invention

The present invention relates generally to the measurement of the mass rate of flow for multiphase flow streams. The present invention relates more specifically to a method and apparatus for measuring the mass rate of flow for multiphase flow streams, and in particular, gas streams having entrained liquids with low (less than 15%) liquid mass fractions.

2. Description of the Related Art

Various methods have been developed and utilized for measuring the flow rate of multiphase flow streams where widely varying amounts of gas and liquid are encountered and where high degrees of measurement accuracy may or may not be important. Orifice meters are often used to meter gas flow streams by creating a pressure differential across an orifice plate from which can be calculated a mass flow rate. Various standard metering equations and commercial metering systems have been developed to meter dry gas (flow streams that are 100% gas) to accuracy levels appropriate for situations involving the sale or transfer of ownership for the material product in the flow stream. Such "fiscal level" metering of dry gas provides an accuracy suitable for contract sale of gaseous products such that no significant monetary cost error occurs in the contract sale. There are clearly situations where even greater accuracy might be desired, such as in technical research and development environments, but for the purposes of the present invention, such fiscal level metering for wet gas flow streams is a suitable objective.

In many situations where flow stream metering is desired and performed, the flow stream is composed of both gases and liquids. The presence of liquids in the flow stream will result in errors in the mass flow rate measurement due to the use of equipment and measurement interpretation techniques intended primarily for dry gas flow measurements.

Production streams from gas wells and the like, flow streams in the gas leg of two or three phase separators, and flow streams in some gas transportation lines, all have entrained liquids in small to moderate amounts. These entrained liquids result from a number of factors ranging from dew point effects to moderate levels of inherent liquid fractions. From an economic standpoint, it is desirable to meter these flow streams without the necessity of conditioning the flow stream with a separator or a dehydration system. This is even more desirable in off-shore oil and gas production where the elimination of the need for a conditioning facility can significantly reduce the necessary platform space, load, and auxiliary requirements, and therefore, reduce the overall cost of the off-shore platform.

In general, by eliminating the need to condition a multiphase flow stream, several costs are avoided. These include the capital costs of the conditioning facility, the installation and maintenance cost of the conditioning facility, and the operating expenses associated with such a facility.

There have been attempts in the past to measure the mass flow rate of multiphase flow streams by a variety of more or less complex systems. Many of these systems are directed to the measurement of steam flow where condensate has an effect on the accuracy of the flow rate measurements. Many are directed to multiphase flow in the oil and gas industry. The following are representative of the state of the art in the measurement of mass flow rate for multiphase flow.

U.S. Pat. No. 1,540,533, issued to Bullock on Jun. 2, 1925, entitled "Flow Meter Installation", describes an early system for utilizing pressure differential to measure flow rate with a combination orifice/venturi nozzle metering run.

U.S. Pat. No. 1,559,155, issued to Bullock on Oct. 27, 1925, entitled "Multirange Flow Nozzle", describes the use of an array of flow nozzles for the creation and measurement of differential pressures.

U.S. Pat. No. 2,136,900, issued to Woolley on Nov. 15, 1938, entitled "Measuring Apparatus", describes an early flow rate system that incorporates auxiliary factors for the correction of standard parameters in measuring the flow.

U.S. Pat. No. 3,100,840, issued to Morganstern on Aug. 13, 1963, entitled "Methods and Apparatus for Measuring and Testing", describes an early use of radiation in the measurement of flow rate.

U.S. Pat. No. 3,378,022, issued to Sorenson on Apr. 6, 1968, entitled "Fluid Flow Sensing System", describes a more complicated system of orifice metering and differential pressure measurement analysis.

U.S. Pat. No. 4,337,668, issued to Zupanick on Jul. 6, 1982, entitled "Orifice Wear Compensation", describes a system for modifying a metering equation constant according to the deterioration of an orifice over a period of time.

U.S. Pat. No. 4,453,417, issued to Moyers et al. on Jun. 12, 1984, entitled "Unitized Measurement Instrument Connector Apparatus", describes an orifice metering system specifically including an array of valves and roddable inserts to improve the operation and maintenance of the system.

U.S. Pat. No. 4,562,744, issued to Hall et al. on Jan. 7, 1986, entitled "Method and Apparatus for Measuring the Flow Rate of Compressible Fluids", describes an orifice plate metering system that integrates temperature differentials into the standard metering equations.

U.S. Pat. No. 4,683,759, issued to Skarsvaag et al. on Aug. 4, 1987, entitled "Characterization of Two-Phase Flow in Pipes", describes the use of gamma radiation transmission measurements to determine the distribution of voids within a gas/liquid mixture flowing in a pipe.

U.S. Pat. No. 4,836,032, issued to Redus et al. on Jun. 6, 1989, entitled "Method of Determining the Quality of Steam for Stimulating Hydrocarbon Production" describes the use of an orifice plate in combination with a choke to measure both steam quality and mass flow rate.

U.S. Pat. No. 5,025,160, issued to Watt on Jun. 18, 1991, entitled "Measurement of Flow Velocity and Mass Flow Rate", describes the use of gamma radiation using dual energy transmission techniques to facilitate a more accurate measurement of flow rate.

U.S. Pat. No. 5,031,465, issued to Redus on Jul. 16, 1991, entitled "Steam Quality and Mass Flow Rate Measurement Using Critical Flow Choke Upstream of an Orifice Plate", also describes a pressure differential metering system that incorporates both a choke and an orifice plate.

U.S. Pat. No. 5,031,466, issued to Redus on Jul. 16, 1991, entitled "Methods and Apparatus for Determining Steam Quantity and Mass Flow Rate", also describes a differential pressure measurement system utilized in conjunction with an orifice plate metering system.

U.S. Pat. No. 5,315,117, issued to Hatton et al. on May 24, 1994, entitled "Volume Meter System", describes a system for determining the liquid or gas fraction of a two-phase flow stream.

U.S. Pat. No. 5,343,041, issued to Ruscev et al. on Aug. 30, 1994, entitled "Method and Apparatus for Determining the Physical Characteristics of a Water Flow", describes a more complex use of gamma ray radiation for measuring the flow of water along a well.

U.S. Pat. No. 5,400,657, issued to Kolpak et al. on Mar. 28, 1995, entitled "Multiphase Fluid Flow Measurement", describes a multiphase metering system that incorporates densitometers in conjunction with a flow meter.

U.S. Pat. No. 5,404,745, issued Chien on Apr. 11, 1995, entitled "Method and Apparatus for Determining Steam Quality From Steam Velocity Measurement", describes a system and method for measuring the critical velocity of steam flowing through a nozzle.

U.S. Pat. No. 5,421,209, issued to Redus et al. on Jun. 6, 1995, entitled "Measurement of Steam Quality and Mass Flow Rate", describes yet another system of pressure measurement involving both an orifice plate and a critical flow venturi.

U.S. Pat. No. 5,479,020, issued to Mohn on Dec. 26, 1995, entitled "Metering Device For a Fluid", describes a meter for use in multiphase flow that incorporates radiation densitometers and is directed to the more accurate use of such radiation techniques.

U.S. Pat. No. 5,501,099, issued Whorff on Mar. 26, 1996, entitled "Vapor Density Measurement System" describes a metering system that attempts to return the flow stream to a homogeneous vapor state prior to metering.

At the present time, the accuracy of standard gas flow metering systems is not known well enough to allow for sound engineering decisions regarding the use of such metering systems for fiscal level metering in wet gas applications. In addition, there are currently thousands of existing well head custody transfer meter runs that are in service on wet gas streams. The accuracy of these meter runs is not known well enough to make sound determinations as to whether they function within the contract requirements associated with the custody transfer. Further, even if attempts are made to provide more accurate metering devices, the most cost effective system with which to upgrade the existing well head meter runs is not clearly known.

It would be desirable, therefore, to have a system for measuring the mass flow rate of a multiphase flow stream that includes devices and methods for correcting the most significant errors in standard metering equations that result from the presence of fluids in the multiphase flow and more particularly in the area immediately adjacent the orifice. It would be desirable for such a system to be simple to implement and require little additional intrusion on the flow stream.

SUMMARY OF THE INVENTION

It is therefore an object of the present invention to implement an apparatus and method for the measurement of the mass flow rate of a multiphase flow that compensates and corrects for the effects of the liquid component of the multiphase flow.

It is a further object of the present invention to identify and implement correction factors in standard metering equations so as to more accurately reflect upstream cross-sectional area and downstream pressure recovery to create a flow rate result that more accurately reflects the actual mass flow rate of the multiphase flow.

It is a further object of the present invention to more accurately determine the upstream cross-sectional area in a multiphase flow conduit and to utilize the more accurate cross-sectional area measurement in standard metering equations.

It is a further object of the present invention to more accurately identify the pressure recovery values downstream of an orifice meter run and to utilize these more accurate pressure values in standard metering equations.

In fulfillment of these and other objectives, the present invention overcomes the metering errors that result from the presence of liquids in standard orifice metering systems by measuring and compensating for the effects of such liquids on the flow stream. Three specific types of effects from the liquid can be readily considered as contributing to the error that results from the presence of liquids in the flow. Two separate measurements are made in the present invention and are used to correct the metered rates for the multiphase flow.

The three types of effects that are generally considered in the present invention include:

1. The reduction in upstream cross-sectional area for the multiphase flow brought about by the presence of the liquids in the flow stream conduit.

2. The change in the pressure drop across the orifice plate as a result of the transport of the liquid fraction of the multiphase flow through the orifice.

3. The change in the pressure recovery downstream of the orifice.

The two measurements that are used in the present invention to correct the metered rates when liquids are present in the flow include an upstream cross-sectional area measurement and a measurement of the pressure recovery change downstream. These measurements are used with standard orifice metering measurements to correct the flow measurement. First, the upstream gas flow cross-sectional area change is used to increase the effective coefficient $C_d$ of the orifice run. Second, the reduced recovery of kinetic energy downstream of the orifice is used to reduce the effective coefficient $C_d$ of the orifice meter.

DESCRIPTION OF THE PREFERRED EMBODIMENT

Figure 1:
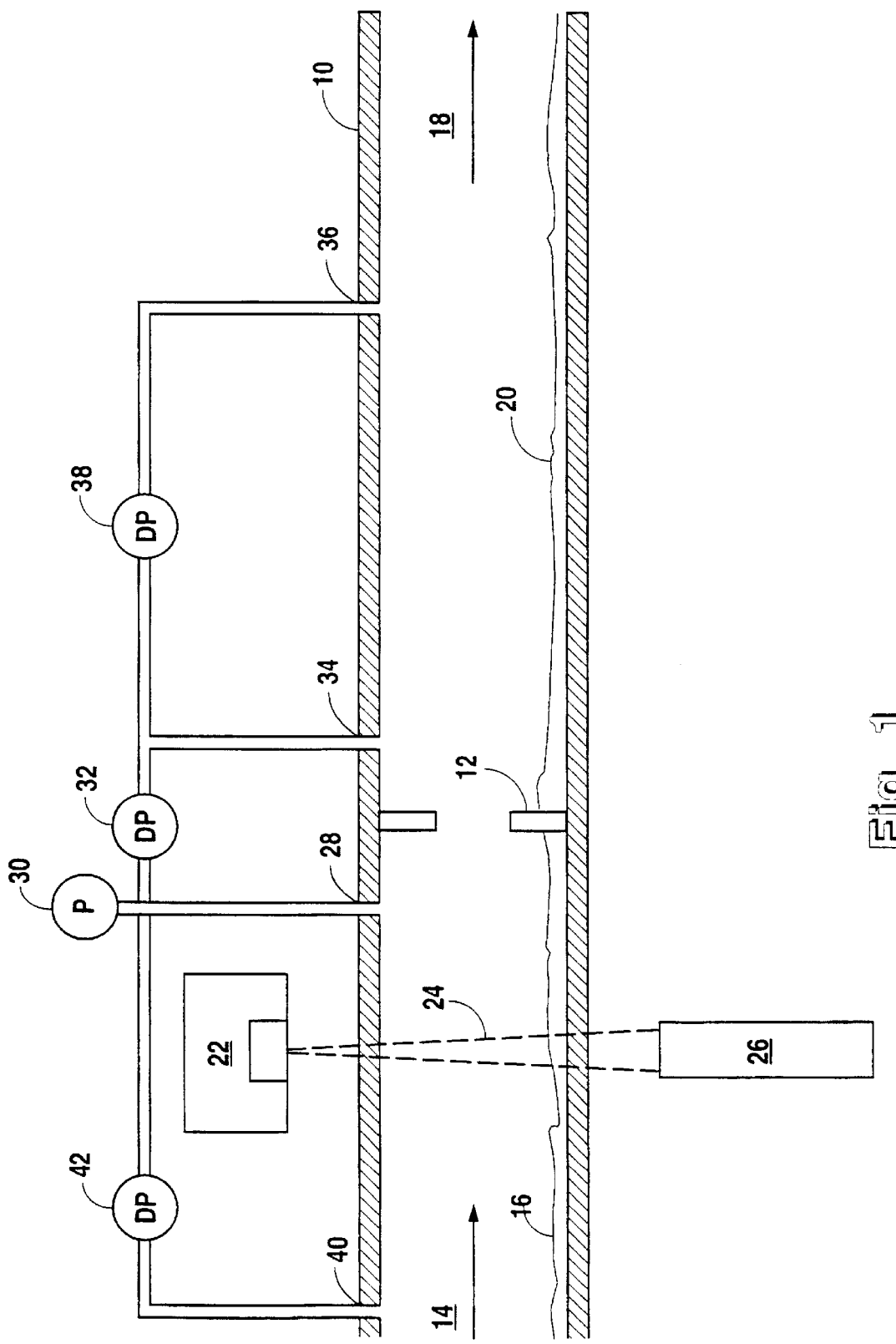
FIG. 1 is a schematic cross-sectional diagram of a horizontal orifice run showing the elements necessary for implementation of the present invention.
Figure 2:
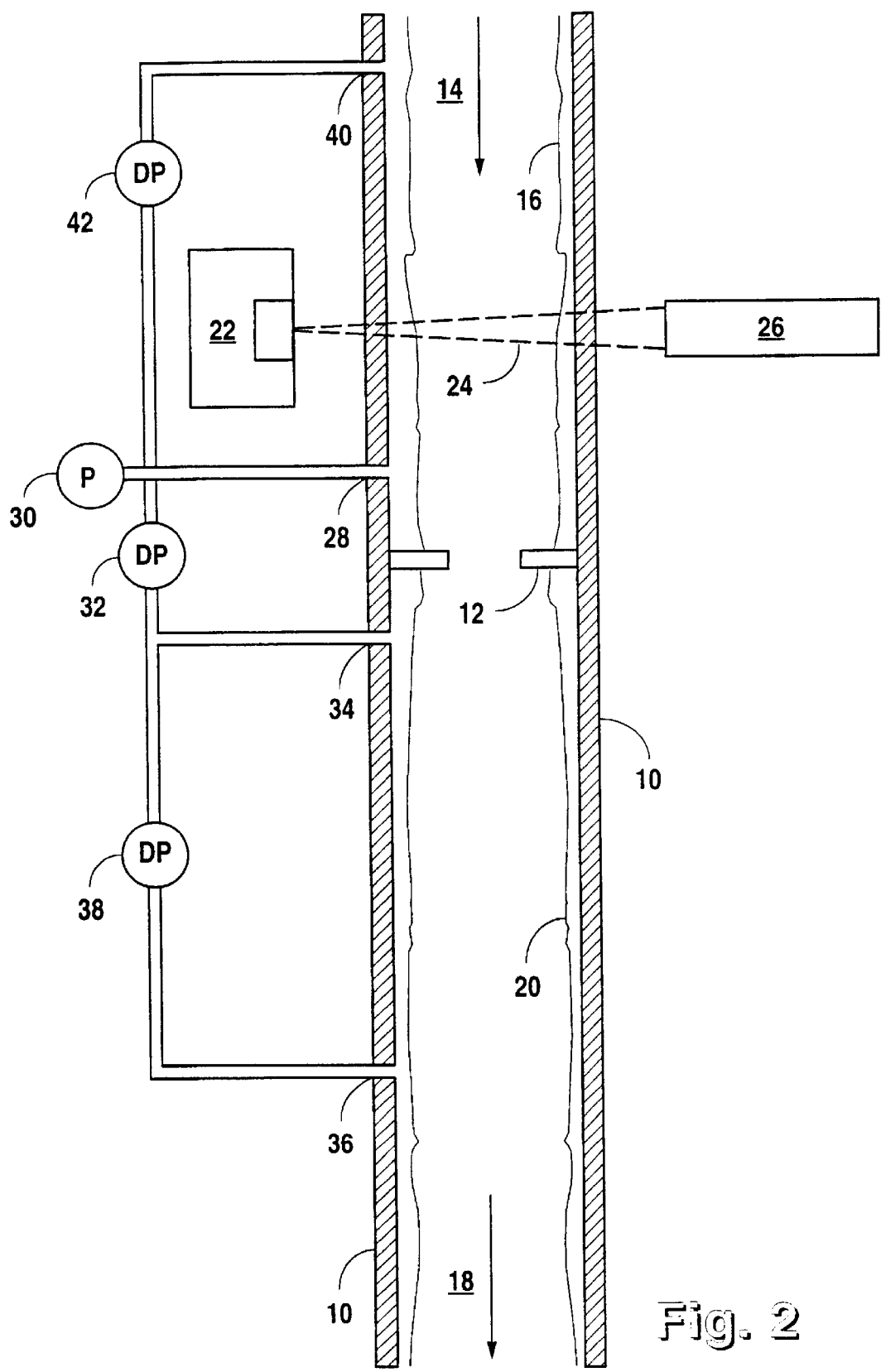
FIG. 2 is a schematic cross-sectional diagram of a vertical orifice run showing the elements necessary for implementation of the present invention.

FIG. 1 discloses the elements of the present invention as applied to a horizontal metering run which takes into account the gravitational effects on the multiphase fluid flow in such an orientation. FIG. 2 discloses the elements of the present invention implemented in a vertical metering run with downward flow that again takes into account the gravitational effects on such an orientation for the multiphase flow. Other orientations between the horizontal and vertical arrangements shown may be handled and instrumented in similar fashion.

In summary, the two types of measurements made and used to correct the metered rates when liquids are present in the multiphase flow are as follows:

1. Upstream gas flow cross-sectional area measured at a pressure tap located upstream of the orificate plate; and
2. Pressure recovery downstream of the orifice plate.

Each of these two correction measurements are discussed separately below.

FIG. 1 discloses conduit (10) which contains the multiphase flow and incorporates an orifice meter run utilizing orifice plate (12) positioned within conduit (10). Upstream flow (14) includes liquid fraction (16) shown as it might position itself in a horizontal orientation. Downstream multiphase flow (18) likewise includes liquid fraction (20).

FIG. 1 discloses the device elements necessary for making the measurements utilized in the present invention. Included are radiation source (22) and radiation detector (26). Radiation beam (24) is utilized to assist in the measurement of the liquid fraction volume and to determine its effects on the cross-sectional area upstream of orifice plate (12). In both FIG. 1 and FIG. 2, radiation source (22) and radiation detector (26) are shown upstream from pressure tap (28) for the sake of clarity. In actual implementation, radiation source (22) and radiation detector (26) would be positioned at the same point as pressure tap (28) upstream from orifice plate (12).

Various pressure taps permit differential pressure and absolute pressures to be determined at a variety of points in the metering run. These pressure taps include upstream orifice pressure tap (28), downstream orifice pressure tap (34), as well as remote downstream pressure tap (36) and remote upstream pressure tap (40). Pressure sensor (30) measures an absolute pressure at upstream orifice pressure tap (28), while differential pressure sensors (32), (38) and (42) measure differential pressures between the pressure taps indicated.

1. Upstream Cross-Sectional Area

Measurement of the upstream cross-sectional area may be achieved by pressure measurements, gamma ray measurements, or other techniques known in the art for determining the fractional composition of the multiphase upstream flow. When the incoming flow is stratified in a horizontal metering run, as shown in FIG. 1, the gas flow cross-sectional area measurement may be made in any of a number of ways.

A differential pressure measurement can be made between a point (28) just upstream of the orifice and a point (40) upstream prior to significant liquid buildup (16) in the face of orifice plate (12). As an alternative approach, a gamma ray densitometer (22) may be configured with gamma ray beam (24) directed across a diameter cord at a point just upstream from orifice (12). As indicated above, the position of such a gamma ray densitometer shown in FIG. 1 and FIG. 2 would, in the preferred embodiment, be the same upstream position as pressure tap (28). Other means for measuring the gas flow cross-sectional area or fractional composition upstream of the orifice are possible.

When the incoming flow stream is not stratified, but rather is in an annular configuration in a horizontal metering setup as shown in FIG. 1, the gas flow cross-sectional area measurement may still be made according to a variety of methods. A gamma ray densitometer with multiple gamma ray beams may be implemented to measure the gas flow cross-sectional area at a point upstream of the orifice as one example. Other means of measuring the gas flow cross-sectional area at a point upstream of the orifice, even when not stratified, are possible.

Reference is now made to FIG. 2 for a description of a vertical or inclined metering run with a downward flow that may reduce or eliminate significant gas flow cross-sectional area changes due to the presence of liquids in the flow. This might especially be true at flow rates for which the flow would become stratified in a horizontal metering run as in the example mentioned above.

Figure 3:
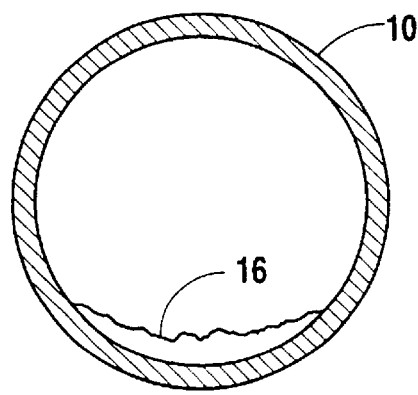
FIG. 3 is a cross-section of the conduit shown in FIG. 1, showing stratified flow in the horizontal configuration.

The device elements necessary for implementing the method of the present invention shown in the vertical configuration of FIG. 2 are basically the same as those elements present in the horizontal configuration described with respect to FIG. 1. The primary difference involves the mechanism and method for measuring the reduction in upstream cross-sectional area. The arrangement in FIG. 1 is likely to result in a stratified flow similar to that disclosed in FIG. 3, where liquid fraction (16) is concentrated against a single wall of conduit (10).

Figure 4:
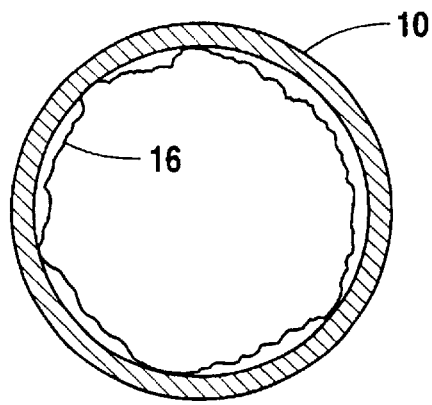
FIG. 4 is a cross-section of the conduit shown in FIG. 2, showing greater annularization of the fluid in the vertical configuration.
Figure 5:
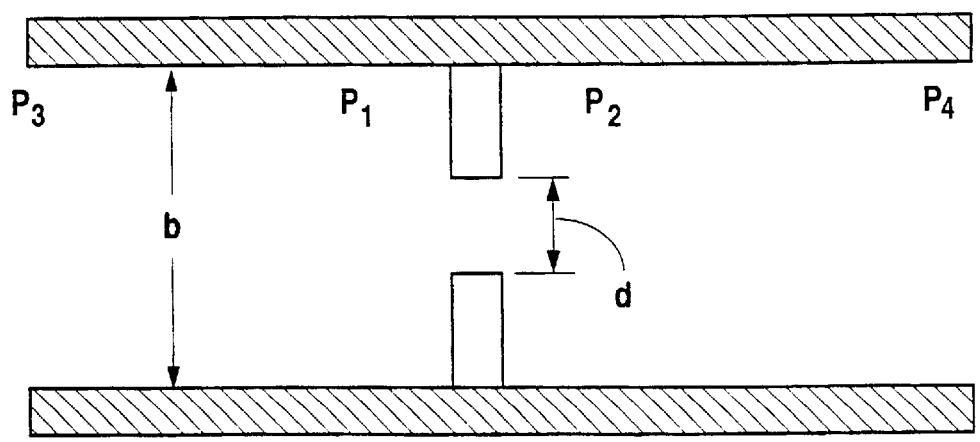
FIG. 5 is a schematic cross-sectional diagram of a basic orifice meter run identifying the various parameters utilized in standard metering equations.

FIG. 4 discloses liquid fraction (16) concentrated in an annular arrangement that results from the absence of gravitational effects in any particular direction against the walls of conduit (10). With this difference, certain modifications to the gamma ray densitometer structure (22) and (26) would be required in order to more accurately identify the liquid fraction (16). Other than this distinction, however, most of the same methods for measuring upstream cross-sectional area can be utilized in the vertical configuration shown in FIG. 2.

Once the gas flow cross-sectional area has been measured, standard metering equations may be corrected for the upstream gas flow cross-sectional area reduction due to the presence of liquids by using the measured cross-sectional area in the equation rather than the normally utilized pipe internal cross-sectional area. In other words, an accurate measurement of the gas/liquid fractional ratio and, therefore, an accurate determination of the effective cross-sectional area of the flow immediately prior to the orifice at the metering pressure tap, provides a more accurate value for the standard metering equations used to determine the flow rate.

Alternatively, as indicated above, the cross-sectional area measurement may simply be incorporated into standard metering equations by modifying the effective coefficient $C_d$ of the orifice run. The result would be no different than that achieved by substituting the cross-sectional area values as indicated above, but given further modifications of the effective coefficient by other factors mentioned below, may provide a more practical methodology.

2. Downstream Pressure Recovery

A determination of the effect of liquid accumulation on the pressure recovery downstream of the orifice plate may be provided by pressure measurements in a number of ways. Referencing again FIG. 1, a differential pressure measurement between a point (34) immediately downstream from orifice plate (12) and a point (36) much further downstream can be made. Alternatively, a differential pressure measurement point can be made between a point (40) well upstream of the orifice metering run and a point (36) well downstream of the orifice.

The pressure recovery measurement can then be compared to a dry gas pressure recovery value for the same conditions of upstream gas stream cross-sectional area, orifice cross-sectional area, gas composition, and orifice differential pressure. From such comparisons, the liquid flow rate and the correct gas flow rate can be calculated. Again, these correctional measurements can be incorporated into the pressure values utilized in standard metering equations or can be included in modifications to the effective coefficient $C_d$ for the orifice metering run. In an automated system where such measurements are made by constantly sensing and quantifying the values of concern, a single equation constant modifier can be supplied to a processing unit for calculating the compensated flow rate value.

We claim:

1. An apparatus for the measurement of correction factors for determining the flow rate of a multiphase flow stream including a combination of liquid and gas fractions, said apparatus comprising:

an orifice positioned within said multiphase flow stream for creating a pressure differential in said multiphase flow stream;

means for measuring a reduction in a cross section of said multiphase flow stream due to the presence of liquids in said multiphase flow stream at a point upstream and proximate to said orifice; and means for measuring a pressure recovery value downstream of said orifice;

wherein a measurement of said reduction in a cross section is used to correct a cross-sectional area value in a standard orifice meter flow rate equation, and a measurement of said pressure recovery value is used to correct a downstream pressure measurement in said standard orifice meter flow rate equation.

2. The apparatus of claim 1 wherein said means for measuring a reduction in said cross section comprises a gamma ray densitometer directed across said multiphase flow stream.

3. The apparatus of claim 1 wherein said means for measuring a reduction in said cross section comprises a differential pressure measurement means, said differential pressure measurement means comprising a first pressure tap into said multiphase flow stream at said point upstream and proximate to said orifice and a second pressure tap into said multiphase flow stream at a point upstream and remote from said orifice.

4. The apparatus of claim 1 wherein said means for measuring a pressure recovery value comprises a differential pressure measurement means, said differential pressure measurement means comprising a first pressure tap into said multiphase flow stream at a point downstream and proximate to said orifice and a second pressure tap into said multiphase flow stream at a point downstream and remote from said orifice.

5. The apparatus of claim 1 wherein said means for measuring a pressure recovery value comprises a differential pressure measurement means, said differential pressure measurement means comprising a first pressure tap into said multiphase flow stream at a point upstream and remote from said orifice and a second pressure tap into said multiphase flow stream at a point downstream and remote from said orifice.

6. A method for measuring correction factors and correcting a flow rate determination for a multiphase flow stream including a combination of liquid and gas fractions, comprising the steps of:

positioning an orifice within said multiphase flow stream for creating a pressure differential in said multiphase flow stream;

measuring a reduction in a cross section of said multiphase flow stream due to the presence of liquids in said multiphase flow stream at a point upstream and proximate to said orifice;

measuring a pressure recovery value downstream of said orifice;

modifying a cross sectional area value in a standard orifice meter flow rate equation by a measured reduction in said cross-section of said multiphase flow stream; and modifying a downstream pressure recovery value in said standard orifice meter flow rate equation by a measured downstream pressure recovery value.

7. The method of claim 6 wherein said step of measuring a reduction in said cross section comprises directing a gamma ray beam across said multiphase flow stream to determine changes in density within said multiphase flow stream and thus a reduction in a flow stream cross section.

8. The method of claim 6 wherein said step of measuring a reduction in said cross section comprises measuring a differential pressure between said point upstream and proximate to said orifice and a point upstream and remote from said orifice.

9. The method of claim 6 wherein said step of measuring a pressure recovery value comprises measuring a differential pressure between a point downstream proximate to said orifice and a point downstream remote from said orifice.

10. The method of claim 6 wherein said step of measuring a pressure recovery value comprises measuring a differential pressure between a point upstream and remote from said orifice and a point downstream and remote from said orifice.

* * * * *